United States Patent
Armstrong et al.

(10) Patent No.: US 8,191,097 B1
(45) Date of Patent: May 29, 2012

(54) METHOD AND APPARATUS FOR HIERARCHICAL DISTRIBUTION OF VIDEO CONTENT FOR AN INTERACTIVE INFORMATION DISTRIBUTION SYSTEM

(75) Inventors: James B. Armstrong, Princeton, NJ (US); Christopher W. B. Goode, Menlo Park, CA (US)

(73) Assignee: Comcast IP Holdings I, LLC, Wilmington, DE (US)

(*) Notice: Subject to any disclaimer, the term of this patent is extended or adjusted under 35 U.S.C. 154(b) by 0 days.

(21) Appl. No.: 09/447,472

(22) Filed: Nov. 23, 1999

Related U.S. Application Data (60) Provisional application No. 60/127,396, filed on Apr. 1, 1999.

(51) Int. Cl.
*H04N 7/173* (2011.01)

(52) U.S. Cl. ............ 725/91; 725/92; 725/114; 725/115; 725/145; 709/213; 709/214; 709/215; 709/216; 709/231; 709/235; 711/117; 711/159; 711/165; 711/170; 711/173

(58) Field of Classification Search .......... 725/91, 725/92, 114, 115, 145, 93, 94, 87; 709/213–216, 709/231, 235; 711/117, 159, 165, 170, 173
See application file for complete search history.

(56) References Cited

U.S. PATENT DOCUMENTS

| | | | |
|---|---|---|---|
| 5,550,577 A | 8/1996 | Verbiest et al. .................. 348/7 |
| 5,581,479 A | 12/1996 | McLaughlin et al. ..... 364/514 A |
| 5,727,150 A | 3/1998 | Laudon et al. ........... 395/200.08 |
| 5,768,681 A | 6/1998 | Dan et al. ........................ 455/5.1 |
| 5,815,662 A * | 9/1998 | Ong ................................. 725/92 |
| 5,873,085 A * | 2/1999 | Enoki et al. ..................... 707/10 |
| 5,898,456 A * | 4/1999 | Wahl ............................... 725/91 |
| 5,936,659 A * | 8/1999 | Viswanathan et al. ......... 725/103 |
| 5,999,351 A * | 12/1999 | Albrecht et al. ................ 360/48 |
| 6,094,680 A * | 7/2000 | Hokanson ..................... 709/223 |
| 6,163,795 A * | 12/2000 | Kikinis ........................ 709/203 |
| 6,173,328 B1 * | 1/2001 | Sato ............................. 709/231 |
| 6,195,680 B1 * | 2/2001 | Goldszmidt et al. .......... 709/203 |
| 6,269,394 B1 * | 7/2001 | Kenner et al. ................. 709/217 |
| 6,275,898 B1 * | 8/2001 | DeKoning .................... 711/114 |
| 6,438,596 B1 * | 8/2002 | Ueno et al. .................... 709/226 |
| 6,510,469 B1 * | 1/2003 | Starnes et al. ................ 709/247 |

* cited by examiner

Primary Examiner — Hunter Lonsberry
Assistant Examiner — Sumaiya A Chowdhury
(74) Attorney, Agent, or Firm — Banner & Witcoff, LLC (57) ABSTRACT

A method and apparatus for storing and distributing video information in an interactive information distribution system by storing video information on either a centralized or de-centralized secondary storage partition in a network of provider and subscriber equipment, and therein distributing the video information to a subscriber having made a request for such video information.

21 Claims, 6 Drawing Sheets

METHOD AND APPARATUS FOR HIERARCHICAL DISTRIBUTION OF VIDEO CONTENT FOR AN INTERACTIVE INFORMATION DISTRIBUTION SYSTEM

CROSS REFERENCE TO RELATED APPLICATIONS

This application claims benefit of U.S. Provisional Application No. 60/127,396, filed Apr. 1, 1999, which is hereby incorporated by reference in its entirety.

BACKGROUND OF THE DISCLOSURE

1. Field of the Invention

The present invention relates to a method and apparatus for providing an improved content delivery system for use with an interactive information distribution system. More particularly, the invention relates to an improved system for allocating, storing and distributing information within a video on demand (VOD) system.

2. Description of the Background Art

Recent advances in digital signal processing techniques and, in particular, improvements in digital compression techniques, have led to a plethora of proposals for providing new digital services via existing telephone, coaxial cable and satellite data networks. For example, it has been proposed to provide hundreds of cable television channels to subscribers by compressing digital data and digital video, transmitting the compressed digital signals over conventional coaxial cable television channels, and then decompressing the signals in the subscriber's receiver.

Another application for this technology is a video-on-demand (VOD) system in which a subscriber communicates directly with a video service provider via telephone lines to request a video program from a video library. The requested video program is then routed to the subscriber's home via telephone lines or via coaxial cable television cables for immediate viewing.

The VOD system may use a frequency multiplexing technique to enable control information for a subscriber's receiver to be transmitted through a cable network back to an information server. Such a system permits bi-directional communications over a single network. In addition, graphical menus are displayed upon the subscriber's television and by using a remote control device, a subscriber selects a desired program for viewing.

Many VOD distribution systems established by the service providers utilize a plurality of cable "head-ends", where each head-end serves as a distribution point for a respective "neighborhood" of subscribers.

Each head-end comprises one or more VOD server systems. Each VOD server system contains subsystems that interface with each other to manage, store and distribute video content. The subsystems usually are composed of a video stream server, primary and secondary data storage units, and host workstations on which various management software applications execute.

The subscriber has thousands of video titles from which to choose. A subscriber selects a video title displayed on their monitor and a signal is sent from the subscriber's location to the local head-end server. The software management applications, for each of the local video stream servers, queries a database to inquire if the chosen content is presently stored at the head-end storage devices. The most popular video content is typically stored locally on the primary storage device. The secondary storage device is typically a large library of the remaining video content.

If the content is present at the head-end, the server will deliver the video package to the subscriber. Alternatively, if neither storage devices at the head-end have the selected video information, the head-end must first retrieve the requested content from the service provider before delivery. Because of this deficiency, there is a delay in transmission of the video information to the subscriber.

Head-ends that are networked together are known as regions and as such, are served by several VOD systems. The service provider, through a managerial software application, controls the introduction and removal of video information to and from these servers. Thus, each region has a plurality of servers and storage equipment, with each head-end having duplicate video content stored therein.

All of this additional storage capacity, in the form of additional storage hardware results in higher system costs. These costs are primarily due to procuring and maintaining reliable storage devices. This in turn increases the cost of building infrastructure and subsequently, the ultimate cost to the consumer.

Thus, there is a need to reduce the cost of implementing and maintaining replicated head-end located storage libraries, while still maintaining the quality and quantity of video titles offered by the service provider. To achieve this, there is a need to support low latency file transfer operations at relatively high but variable rates using a variable bit rate (VBR) transport, support high quality streaming transport at various control bit rates, as well as supporting appropriate control message flows.

SUMMARY OF THE INVENTION

The disadvantages heretofore associated with the prior art are overcome by the present invention of a system for storing and distributing video information in an interactive information distribution system. In the exemplary embodiment of the invention, a system head-end is comprised of subsystems that are used to manage, store and distribute video content: namely a video stream server, a primary storage device and a management application that is executable through a general purpose computer (e.g., a workstation host or personal computer).

The system redistributes the secondary storage devices to serve as a shared secondary storage partition on an inter-server network. As such, various head-end servers can share information, thus reducing the overall storage requirements for the system. Such a beneficial reduction in storage hardware can be made because of a distributive method of allocating the video libraries.

The inventors have recognized that of the vast number of available video titles (and associated video assets), only a small percentage of titles may be considered "popular" by the subscribers at any one time. Therefore, a large portion of the video assets are not requested with any frequency. For example, if there are 1000 movies, typically less than 25% will actually be requested on a regular basis to qualify as being popular. This means that the remaining 750 movies are infrequently requested and are being stored at each head-end without being accessed very often. Such under-utilization and replication of these storage assets is costly to sustain.

A method of monitoring and storing video information, based upon a rate of video requests from subscribers, enables the system to store the content more efficiently. If shown to be in popular demand by the consumer, such as by surpassing a threshold request rate set by a service provider administrator, the "high request" video assets are stored across all the neighborhood servers. The remaining "low request" video assets are divided and distributed among the secondary storage partitions. Numerous threshold rates may be established for each video asset. This method allows multiple disbursements of the video asset to either a single video server or some multiple thereof, which is less than all of the video servers in the entire VOD system.

In one embodiment of the invention, a "remote server" is advantageously configured to replace all of the secondary storage devices located at each of the head-ends. The remote server and its associated primary and secondary storage partitions are established at a remote site and linked within a network of preferably three or more head-ends. These storage partitions contain the library of VOD assets presently stored on both the primary and secondary storage devices. The primary storage partition holds frequently requested video assets while the secondary storage partition (e.g. a magneto optical storage device, fiber channel hard drives or otherwise) holds the remaining infrequently requested video content. To manage the distribution of video assets, the remote server executes various management tools.

In those instances when a subscriber has requested video assets not stored on the primary storage partition at the local head-end, the content manager will retrieve the desired video content from the remote server. The remote server may function as a head-end itself by serving the video assets directly to the subscribers. This is accomplished by transmitting the video assets through an access network at the subscriber's local head-end and thereby bypassing the local server. Alternatively, the remote server may be used as a source for copying video assets to other head-end servers for storage and distribution.

In a second embodiment, the network of local stream servers is considered as a "virtual remote server." This extends the concept of a remote server as the central repository of all video assets in the network. Using this method, a number of stream servers connected by a fast network capable of constant and variable bit rate (CBR and VBR) transport service, will provide a subscriber with a selection of movies and other assets that are greater than the storage capacity of any individual stream server.

The video assets considered popular, as determined by the frequency of subscriber requests, are stored on the primary storage partitions in all the neighborhoods. The remaining infrequently requested video assets are divided and then selectively distributed amongst the neighborhood head-ends on the secondary storage partitions.

One function that this VOD network satisfies is to transport video streams at various bit rates with an appropriate quality of servers. Another function is to support low latency file transfer operations at relatively high bit variable rates, using a VBR transport. Finally, the network supports appropriate control message flows.

Thus, the current requirement of having secondary storage partitions for additional storage of infrequently requested video content, as well as having backup at each head-end site has been eliminated. This redistribution of storage space by either embodiment provides geographical locality for the introduction and removal of video content. Similarly, it reduces the cost for storing archived content, improves performance in retrieving content, and reduces the disk storage capacity of the individual stream servers.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
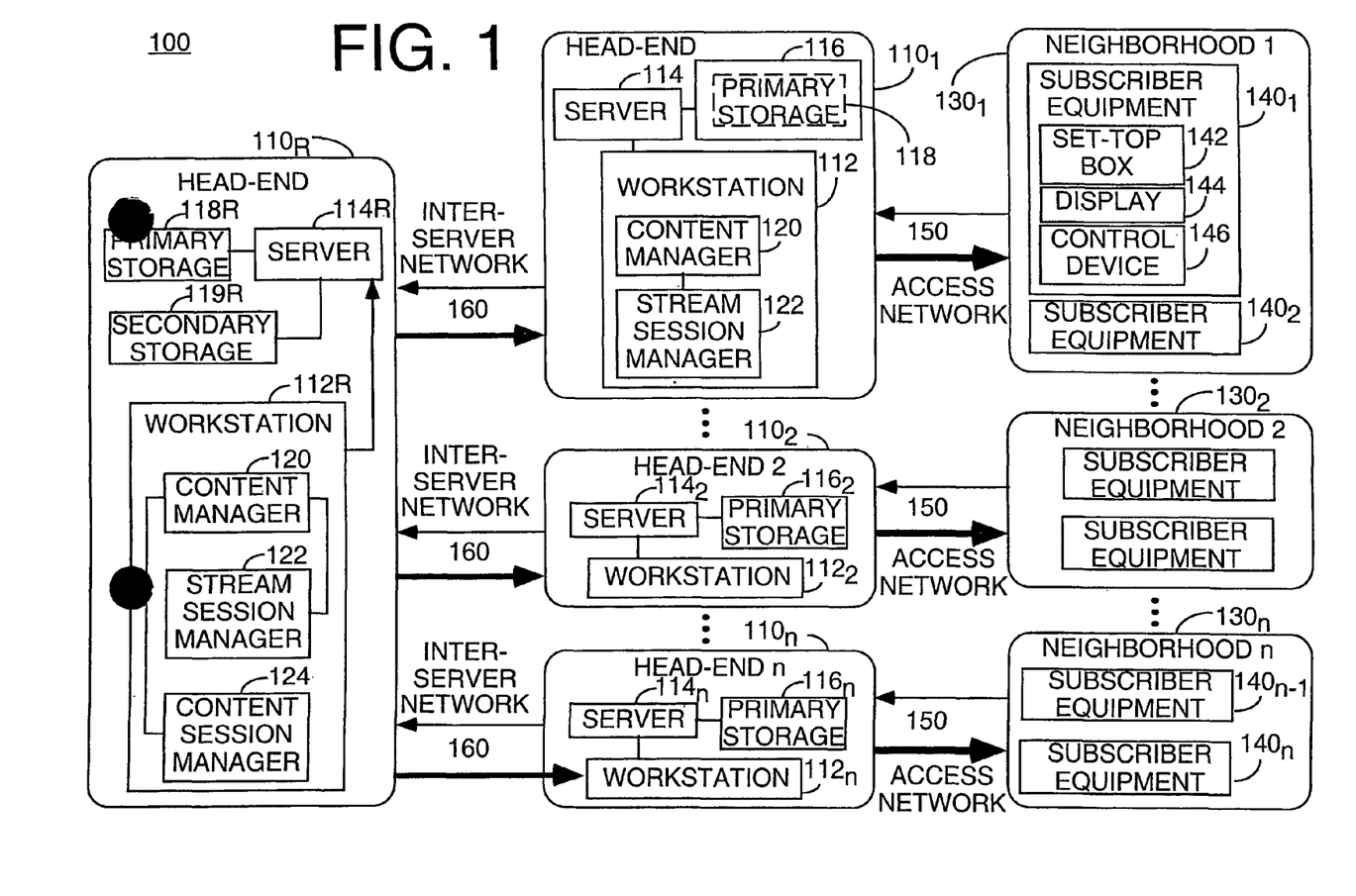
FIG. 1 depicts a high-level block diagram of a first embodiment of an interactive information distribution system in accordance with the invention.

In an interactive information distribution system, a method and apparatus is provided for distributing video assets to a plurality of subscribers, and redistributing video assets stored on primary and secondary storage devices. FIG. 1 depicts a high-level block diagram of an interactive information distribution system.

Specifically, the interactive information distribution system 100 comprises a plurality of head-ends $110_1$ through $110_n$ (collectively head-ends 110), each of said head ends 110 being coupled to at least one of a corresponding plurality of neighborhoods $130_1$ through $130_n$ (collectively neighborhoods 130), and a remote server head-end 110R. Each of the head-ends 110 comprises various subsystems that store and distribute video content. The terminology "video content", "video asset" and "video information" as used herein are equivalent.

Each head-end 110 comprises a host workstation 112, a video stream server 114 and a primary storage partition 118. The primary storage partition 118 and host workstation 112 are coupled to the video stream server 114. In the exemplary embodiment, the primary storage partition 118 comprises an array of small computer systems interface (SCSI) or fiber channel hard drives.

The host workstation 112 allows an operator to interface with a series of management tools including a content manager 120, a stream session manager 122 and content session manager 124. These management tools perform various system command and control functions such as allocating transmission paths and monitoring the video streams through a communications network to and from the neighborhoods 130. The managers may be implemented as hardware, software, or a combination of hardware and software.

Each neighborhood 130 serves a plurality of subscribers. The interactive information distribution system 100 transmits video streams from the video stream server 114 to the subscriber's respective subscriber equipment 140. The subscriber equipment 140 comprises a set-top box 142, a display 144 and a control device 146.

The neighborhoods 130 are linked to their respective head-ends 110 through an access network 150. The stream session manager 122 at each of the head-ends 110, controls the transfer of video assets over the access network 150. Throughout this description the term "local" will be used to denote a head-end 110 or subscriber equipment 140 that is associated with a neighborhood 130 in which a subscriber request for a video asset has been initiated.

The remote server head-end 110R comprises a remote server 114R (i.e., a video stream server) and a primary storage partition 118R coupled to the remote server 114R. A secondary storage partition 119R is also coupled to the remote server 114R. The secondary storage partition 119R illustratively may be magneto optical storage devices or hard disk drives. The host workstation 112R, which includes the content manager 120R, stream session manager 122R and content session manager 124R, interfaces with the plurality of head-ends 110, through an inter-server network 160.

A primary storage partition 118 of a head-end 110, including the remote server head-end 110R, is used to store frequently requested video assets. Alternately, the secondary storage partition 119R of the remote server head-end 110R is used to store infrequently requested video assets.

The content manager 120 tracks the number of requests for a video asset and produces an asset request rate. An operator using the host workstation 112 defines a threshold rate for each video asset. The content manager 120 periodically compares the asset request rate against the threshold rate for each video asset in the system 100. If the asset request rate traverse the threshold rate for a video asset, then the video asset is stored on the primary storage partitions 118 and 118R at each of the head-ends 110 and 110R. If the asset request rate does not traverse the threshold rate for a video asset, then the video asset is stored on the secondary storage partition 119R at the remote server head-end 110R. In this manner video assets are dynamically distributed throughout the interactive information distribution system 100.

A subscriber in a neighborhood 130 uses the control device 146 to select and request video assets for delivery and viewing on the display 144. At the local head-end 110, the content manager 120 determines whether the video asset is locally stored at the head-end 110. If the requested video content is locally stored (i.e. on the primary storage partition 118), the local video stream server 114 accesses and delivers the locally stored video asset to the set-top box 142 of the requesting subscriber's equipment 140, thereby fulfilling the request.

If the video asset is not locally stored at the head-end 110, then the content manager 120 contacts the content session manager 124 at the remote server head-end 110R. The remote server head-end 110R will then transmit the requested video information by alternate methods, depending on the circumstances.

The decision as to whether to stream the requested video directly to the subscriber 140 from the remote head-end 110R, or transfer or migrate assets from the remote head-end 110R to the local head-end 110, and then stream from the local head-end 110 to the subscribers 140 depends on various factors. These include the availability of isochronous bandwidth on the inter-server network 160, the current usage of the requested movie or video asset by other subscribers, the quality of service selected for the delivery of the service, and the availability of space on the local video stream server 114 for storage of the video information. By using various algorithms, these factors are addressed by the content managers, which is generally responsible for checking the status of the servers.

One method comprises the steps of retrieving the requested video information from the secondary storage partition 119R of the remote server head-end 110R, and then the remote server 114R transmits the requested video through the inter-server network 160 to the local neighborhood 130 where the request originated. The video stream server 114 at the local neighborhood head-end 130 receives the requested video asset, and then transmits it to the requesting subscriber over the access network 150 for viewing on the subscriber equipment 140. This method may be used when it is also desirable to store the video asset at the local head-ends 110.

Alternately, a second method comprises the steps of the remote server 114R retrieving the requested video asset from the secondary storage partition 119R at the remote server head-end 110R. The remote server 114R then transmits the video asset over the inter-server network 160 and access network 150 directly to the requesting subscriber's subscriber equipment 140. In this way, the remote server head-end 110R utilizes the local head-end 110 as a conduit for transmitting the video information and avoids interfacing with the local server 114.

Figure 2:
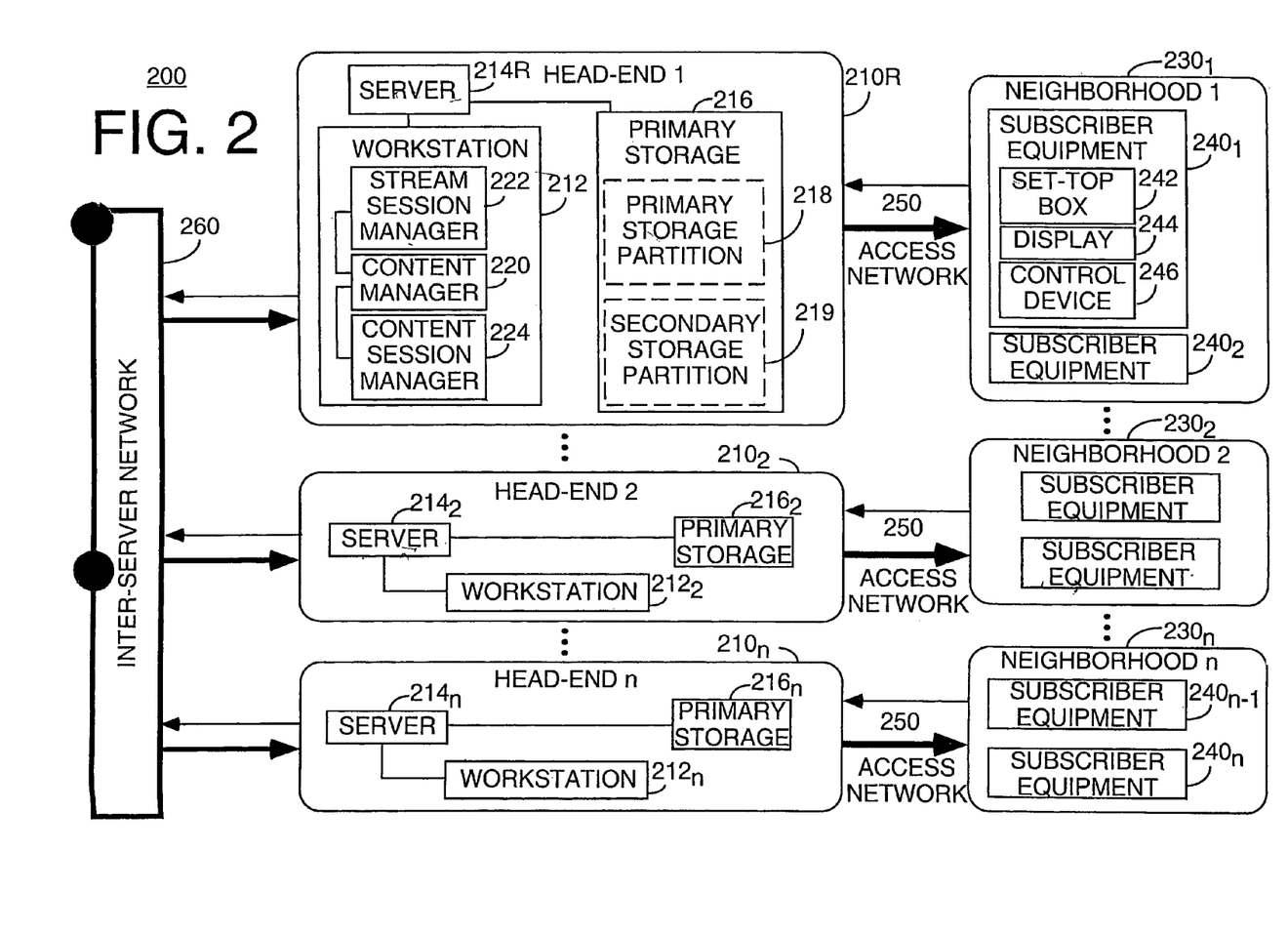
FIG. 2 depicts a high-level block diagram of a second embodiment of an interactive information distribution in accordance with the invention.

FIG. 2 depicts the block diagram of a second embodiment of an interactive video distribution system 200. Specifically, the interactive information distribution system 200 comprises a plurality of head-ends $210_1$ through $210_n$ (collectively head-ends 210), each of said head ends 210 being coupled to at least one of a corresponding plurality of neighborhoods $230_1$ through $230_n$ (collectively neighborhoods 230).

The head-ends 210 are comprised of various subsystems that store and distribute video content. Specifically, a host workstation 212, a video stream server 214 and a primary storage device 216. The primary storage device 216 and host workstation 212 are coupled to the video stream server 214. In the exemplary embodiment, the primary storage device 216 comprises an array of small computer systems interface (SCSI) or fiber channel hard drives. Furthermore, the primary storage device 216 is apportioned into at least two storage partitions designated as a primary storage partition 218, and a secondary storage partition 219.

The host workstation 212 interfaces with a content manager 220, a stream session manager 222 and a content session manager 224. These are management tools that perform various system command and control functions, as well as allocate transmission paths and monitor the video streams through a communications network to and from the neighborhoods 230. The managers may be implemented as hardware, software, or a combination of hardware and software.

Each neighborhood 230 serves a plurality of subscribers. The interactive information distribution system 200 transmits video streams from the video stream server 214 to the subscriber's respective subscriber equipment 240. The subscriber equipment 240 comprises a set-top box 242, a display 244 and a control device 246.

The neighborhoods 230 are linked to their respective local head-ends 210 through an access network 250. The stream session manager 222 at each head-end 210 controls the transfer of video information to and from the subscriber equipment 240 over the access network 250. Throughout this description the term "local" head-end will be used to denote a head-end 210 that is associated with a neighborhood 230 or subscriber equipment 240 within that neighborhood 230 where a request for video information by a subscriber has originated.

The primary storage partition 218 on the primary storage device 216 at each head-end 210 is used to store frequently requested video assets and temporarily cached library video assets. Each primary storage partition 218 at each head-end 210 typically has the same frequently requested video assets as any other head-end 210.

The secondary storage partition 219 is used to store portions of the infrequently requested video assets. An entire library of infrequently requested video assets is divided and stored amongst the plurality of head-ends 210 at each of the secondary storage partitions 219 on their respective primary storage devices 216.

An infrequently requested video asset is typically stored on the secondary storage partition 219 at a single head-end 210. However, the request rate for that video asset may warrant additional storage at other head-ends 210. As such, the content may be replicated and stored thereafter. In this manner, video assets that do not warrant storage across the entire system of head-ends 210 in the interactive information distribution system 200, may still be dynamically stored at multiple head-ends 210. Such dynamic storage corresponding to those neighborhoods having higher request rates than others is made in accordance with an algorithm that allows maximum access to the video titles with minimum network cost associated with their delivery.

A subscriber in a neighborhood 230 uses a control device 246 to select and request a video asset for delivery and viewing on the display 244. At the local head-end 210, the content manager 220 determines whether the video asset is locally stored at the head-end 210. If the requested asset is locally stored (i.e. at the primary storage partition 218 on the primary storage device 216), the local video stream server 214 accesses and delivers the locally stored video asset to the requesting subscriber's equipment 240, thereby fulfilling the request.

If the video asset is not locally stored at the head-end 210, then the content manager 220 contacts the content session manager 224 at a remote head-end 210 where the infrequently requested video asset is located. Throughout this description the term "remote" head-end will be used to denote a head-end and its corresponding sub-systems that are associated with that head-end containing video information not locally available on at a local head-end when requested by a subscriber. The suffix "R" will denote the corresponding elements at that head-end that form a portion of the remote head-end.

The video stream server 214R at the remote head-end 210R retrieves the infrequently requested video assets from its respective secondary storage partition 219R. The video stream server 214R then transmits the retrieved video information over the inter-server network 260 to the local head-end 210 from where the request for video information initiated (for example, head-end $210_1$). The local video stream server 214, operating as an intervening server with respect to the requesting subscriber and remote head-end 210R, directs the requested video assets from the inter-server network 260 to the subscriber equipment 240, via the local head-end 210 and the access network 250.

Various factors may be involved as to whether to stream directly from the remote head-end 210R to the subscriber equipment 240. Typically, they include the availability of isochronous bandwidth on the inter-server network 260, the current usage of the requested movie or video asset by other subscribers, the quality of service selected for the delivery of the service, and the availability of space on the local video stream server 214 for storage of the video information.

Alternately, in the instance where local storage is desired, the video stream server 214 at the local head-end 210 receives the vided information from the remote head-end 210R. Upon receiving the streamed information, the video stream server 214 concurrently stores the assets locally, and transmits the infrequently requested video information over the access network 250 to the requesting subscriber for viewing on the subscriber equipment 240.

The video assets may be streamed in either real time or in bursts. Where the video asset is simply being presented to the subscriber for viewing, the content is streamed in real time, thereby alleviating any need for buffering of the content. If the video asset is also going to be stored at the local head-end 210, then the video asset may be transmitted or migrated in bursts, i.e., streaming at a maximum rate of transfer by the remote video stream server 214R according to bandwidth availability. The video asset is then stored on the primary storage device 216 at the local head-end 210. After a sufficient amount of the video asset is stored, the local video stream server 214 will stream the video asset to the subscriber in real time for presentation on the subscriber equipment 240. As the asset is sent to the subscriber, the remaining amount of the asset is stored in the primary storage device 216.

In the case where infrequently requested video content is deemed desirable to have stored at other head-ends 210, the infrequently requested video asset is retrieved from the remote head-end 210R having such video asset stored on the head-end's secondary storage partition 219. The infrequently requested video asset is then transmitted by the remote video stream server 214R in bursts across the inter-server network 260, to the local head-ends 210 designated by the content manager 220 to store such video asset.

Such movement of video assets occurs in this manner, based upon the system level algorithms having specified threshold rates, as opposed to an individual subscriber requesting a video asset stored at a remote head-end site. Thus, the video assets designated for movement from one server to another occur during system level maintenance, i.e., in the background to any subscriber requesting video assets.

Once each local video stream server 214 receives the infrequently requested video asset, it then stores it on its respective primary storage device 216 at the primary storage partition 218. In this manner, an infrequently requested video asset that later in time becomes frequently requested, may be removed from the remote secondary storage partition 219 at the remote head-end 210R, and transferred to some or all of the plurality of local head-ends 210. Thus, highly requested video assets are distributed broadly across the network of video stream servers. This serves as an effective method to satisfy the high request rates by the subscribers.

Conversely, a frequently requested video asset stored at the primary storage partition 218 on the primary storage device 216 at each head-end 210 may become infrequently requested over a period of time, or for that matter, during various hours of a day. The content manager 220 determines which head-ends 210 are to be designated as a remote head-end 210R for storing such infrequently requested video asset. In this instance, the content manager 220 also controls the transfer of that video asset from a local head-end 210 storing the video asset on its primary storage partition 218, to the secondary storage partition 219 of a head-end 210R designated to store such infrequently requested video asset. After the transfer of the video asset is made to the secondary storage partition 219, the video asset may be deleted from the primary storage partitions 218 at each of the local head-ends 210 where the low request rate does not warrant duplicate storage.

These methods of asset allocation ensure greater storage capacity at each head-end 210 for content that is accessed by subscribers. Additionally, by distributing the video assets at selected local head-ends 210 based upon the subscriber request rates, network bandwidth will be used with greater efficiency and the subscribers will receive their product with minimal delay.

Figure 3:
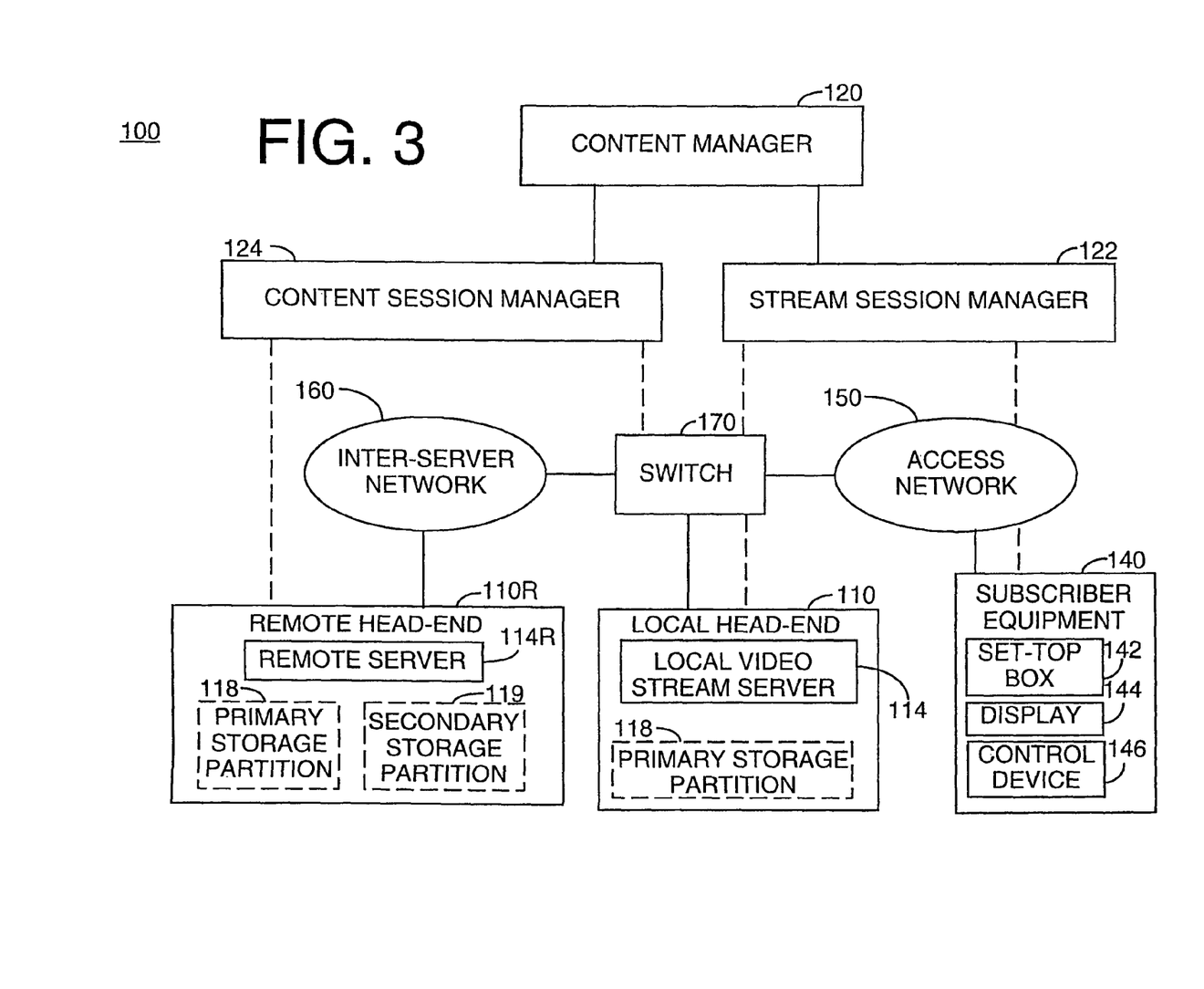
FIG. 3 depicts a graphical representation of the interrelationships amongst a plurality of management tools, provider equipment and subscriber equipment useful in understanding the invention.

FIG. 3 depicts a graphical representation of the interrelationships amongst a plurality of management tools, provider equipment, and subscriber equipment. Furthermore, FIG. 3 represents the subject matter of FIG. 1 only, however, FIG. 3 similarly applies to the subject matter depicted in FIG. 2. The content manager 120 and stream session manager 122 are located at each of a plurality of local head-ends 110, and are linked to each other. The stream session manager 122 manages and controls transmissions to and from the subscriber equipment 140 and a local video stream server 114 at the local head-ends 110 supporting the subscriber equipment 140.

An access network 150 is a transmission medium between the head-end 110 and subscriber equipment. The access network 150 may be comprised of telephone lines, coax cable, satellite links, fiber optics hybrid-fiber coaxial or a combination thereof.

A content session manager 124 is linked to the content manager 120, as well as communicating with a remote head-end 110R having a remote server 114R and storage partitions. The content session manager 124 controls the flow of video assets between the local video stream servers 114 at the local head-ends 110 and the remote head-end 110R. For purposes of this FIG. 3, the use of the suffix "R" designates a remote location and hardware having infrequently requested video assets stored therein.

Illustratively, in the first embodiment as depicted by FIG. 1, infrequently requested video assets are centrally stored on the secondary storage partition 119 at the remote server head-end 110R. Thus, the content session manager 124 is also centrally located at the remote server head-end 110R. In the second embodiment, as shown in FIG. 2, the infrequently requested video assets are de-centrally located because they are divided amongst each of the plurality of head-ends 210 within the interactive video distribution system 200. Thus, the content session manager 224 is located at each of the plurality of head-ends 210. In either embodiment 1 or 2, the interrelationships between the management tools, provider equipment and subscriber equipment is functionally the same.

Referring back to FIG. 3, the remote head-end 110R is linked to the plurality of local head-ends 110 through an inter-server network 160 via switch 170. Switch 170 also interconnects the access network 150 and an inter-server network 160. As such, any communications between each of the video stream servers 114 and the stream session manager pass through the switch 170. Likewise, any communications between the content session manager 124 and the remote head-end 110R also pass through the switch 170.

Flow of video information from the remote head-end 110R may take either of two paths. Across the inter-server network 160 through the switch 170 and into the local video stream server 114 at the local head-end 110, or across the inter-server network 160 through the switch 170 and across the access network 150, directly to the subscriber equipment 140.

The content manager 120 also monitors the frequency of subscriber requests for video assets. This allows the interactive information distribution system 100 to control video asset storage and distribution, based on the frequency of requests when compared to a threshold rate. A threshold rate is a value for each requested video asset, established by the service provider in the interactive information distribution system 100, which defines a level to be considered as frequent or infrequent requests by the subscribers.

Each video asset may have multiple threshold rates. Multiple threshold rates are set to establish various parameters for the storage locations of video information. Such parameters include discarding the video asset, storing it at a single head-end 110, replicating the video asset and storing it at more than one head-end 110 where the request rate warrants it, or storing it at all the head-ends 110 across the entire interactive information distribution system 100.

Threshold rates may also be utilized to determine storage at a particular head-end based on the time of day when a video asset is most frequently requested. For example, video assets pertaining to children's shows are mostly viewed during the day before 6:00 p.m. In the evening, such video content may be discarded at a majority of the head-ends so as to allow for the storage of adult type content usually viewed in the evening by the adult subscribers.

The content session manager 124 updates the content manager 120 of any changes in the distribution of video assets amongst the local video stream servers 114. The content manager 120 at each head-end 110 maintains files regarding the storage and distribution of various movies and other video assets across the entire interactive information distribution system 100.

In operation, at each of the local head-ends 110, the stream session manager 122 controls a navigation session by communicating with the subscriber equipment 140. The subscriber selects and requests a choice of video content, such as a movie, using a control device 146 of the subscriber equipment 140. The stream session manager 122 sends the request from a set-top box 142 in the subscriber equipment 140 to the content manager 120. The content manager 120 then queries its inventory files as to the location of the content.

If the content manager 120 determines that the requested video asset is located at the local head-ends 110 on the primary storage partition 118, then the stream and session manager 122 is notified to deliver the requested video asset. The stream session manager 122 instructs the video stream server 114 to transmit the video information through the access network 150 to the subscriber equipment 140 for viewing on the display 144.

If the content manager 120 determines that the requested video asset is not located at the local head-ends 110, but rather on the secondary storage location 119 at the remote server head-end 110R, the stream and session manager 122 contacts the content session manager 124 through the content manager 120. The content session manager 124 regulates transmission and flow of the requested video assets from the remote server 114R to the local video stream server 114.

The content session manager 124 then instructs the remote server 114R to transmit the video information through the inter-server network 160 to the requesting local head-end 110. Once received by the requesting local head-end 110, the video assets are transmitted over the access network 150 to the subscriber's equipment 140 for viewing on the display 144. Alternately, if a threshold value has been traversed, the local video server 114 is notified by the content manager 120 to begin storing the video asset on its storage device 116 prior to its transmission over access network 150 to the subscribers.

Figure 4A:
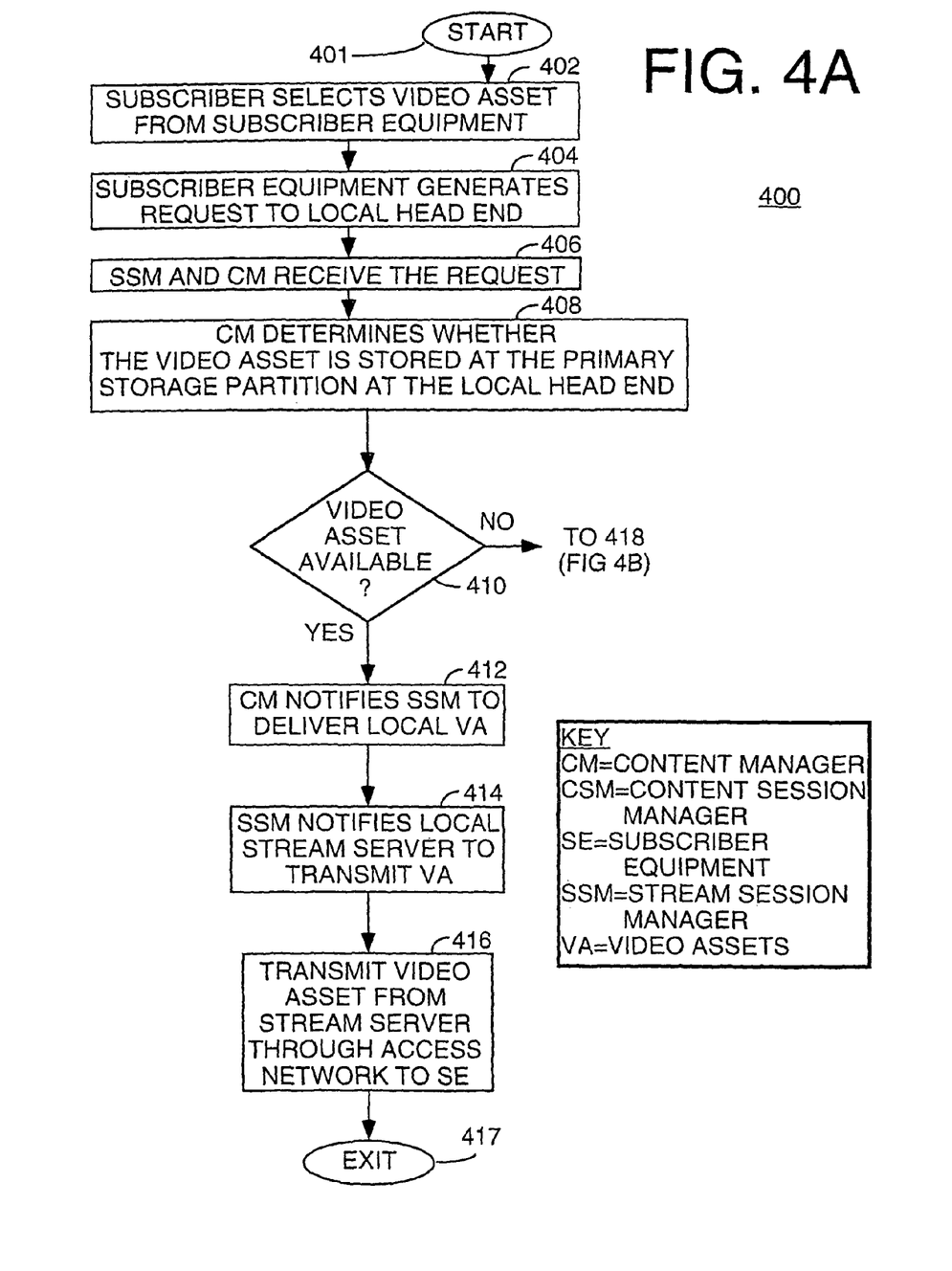
FIGS. 4A and 4B together depict a flow diagram of a method of allocating video information suitable for use in the interactive information distribution systems of FIG. 1 and FIG. 2.
Figure 4B:
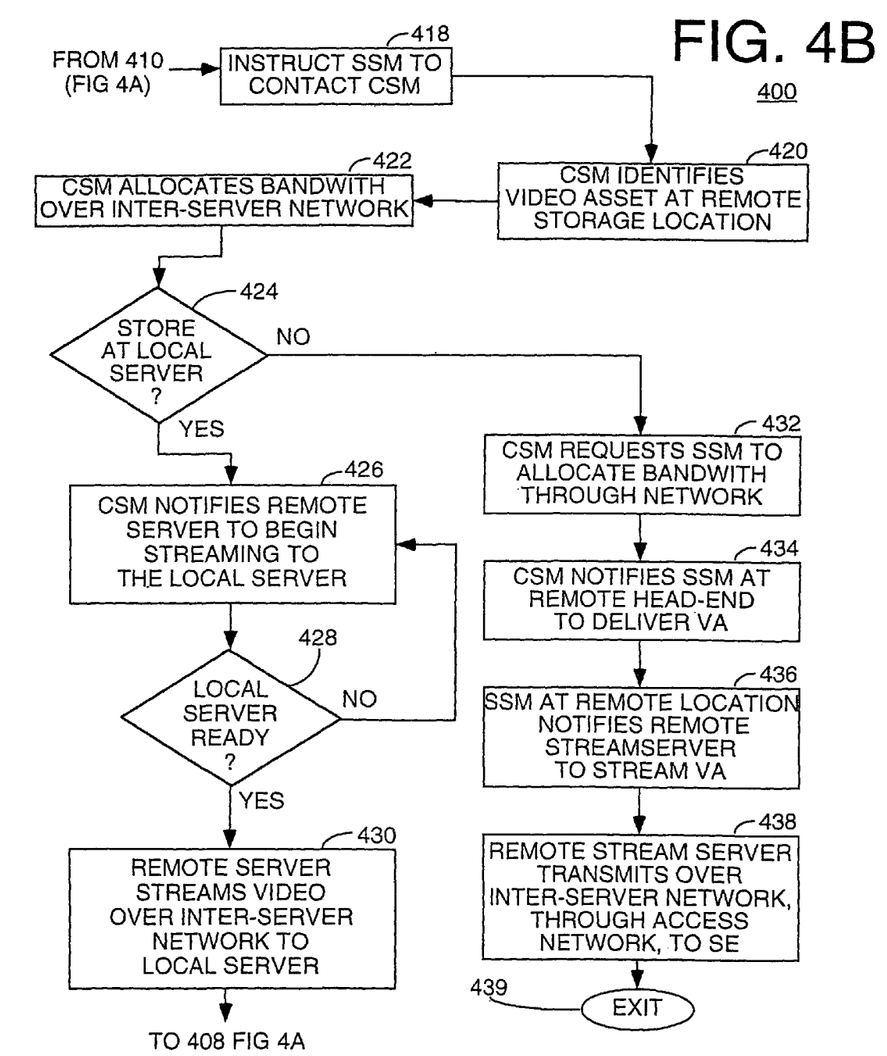

FIGS. 4A and 4B together depict a flow diagram representing a method 400 of allocating video information based upon subscriber requests. It further demonstrates the method of distributing video information. The method 400 is used in an interactive information distribution system 100 or 200 of FIGS. 1 and 2. At step 402, the subscriber selects a video asset from a title listing on the display of the subscriber's equipment. At step 404, a request is transmitted to the local head-end by the subscriber whereupon, at step 406, a stream session manager and a content manager receive the request. At step 410, the content manager queries its files to determine if the requested video information is currently stored on the primary storage partition at the local head-end.

If the video information is locally stored on the primary storage partition at the local head-end, then the method 400 proceeds to step 412, where the content manager notifies the stream and session manager to transmit the requested video information.

The stream and session manager controls the transmission and receiving of streamed video information on the local video stream server. At step 414, the stream and session manager notifies the video stream server to transmit the requested video information. At step 416, the video stream server transmits the video information, through the access network, to the subscriber's equipment for viewing on a display and the method ends at step 417.

If, to the query at step 410 that is negatively answered, where the video information is not locally stored on the primary storage partition at the local head-end, the method proceeds to step 418 (FIG. 4B) where the stream and session manager sends the request to the content session manager. At step 420, the content session manager then identifies the video information stored on the remote storage location (i.e., the secondary storage partition at the remote server head-end, as depicted by the first embodiment of this invention in FIG. 1, or the secondary storage partition at each head-end, as depicted by the second embodiment of this invention in FIG. 2).

After the video information is identified, the content session manager, at step 422, allocates the necessary bandwidth on the inter-server network. At the remote head-end, the content session manager determines the most efficient route to allocate the video asset to the requesting head-end. The content manager allocates a path for transmission based upon factors such as network bandwidth, popularity of the requested asset in view of subscriber requests, and storage capacity at the local server.

At step 424, the method 400 queries whether the video assets are to be transferred to the local video server, as opposed to being streamed directly to the subscriber. If the query of step 424 is affirmatively answered, the method proceeds to step 426 where the content session manager notifies the remote server to begin streaming to the local server. The remote server will wait for a response from the local server signifying that the local server is ready to receive the video stream. If at step 428, no reply is given in some pre-designated time, the remote server will continue to notify the local server until a "ready" response is received. Once the remote server receives the ready signal, the method 400 proceeds to step 430 where the remote video server streams the video information over the inter-server network to the local video server. The local video server then transmits the video information to the requesting subscriber. If at step 424 the query is negatively answered, i.e., the method determines that the video information at the remote head-end is not to be transferred to a local video server, then at step 432, the content session manager additionally requests the stream session manager to allocate bandwidth through the access network.

Once the bandwidth on the access network is allocated, the content session manager notifies, in step 434, the stream session manager at the remote head-end to start streaming the requested video asset. At step 436, the remote stream session manager then signals the remote stream server to begin streaming the video. At step 438, the remote stream server transmits the video asset over the allocated bandwidth of the inter-server network, across a network interface switch, and through the access network to the final destination, the subscriber equipment. The method 400 ends at step 439. These alternate methods provide effective options to transmit video assets under various conditions in the interactive information distribution system.

Figure 5:
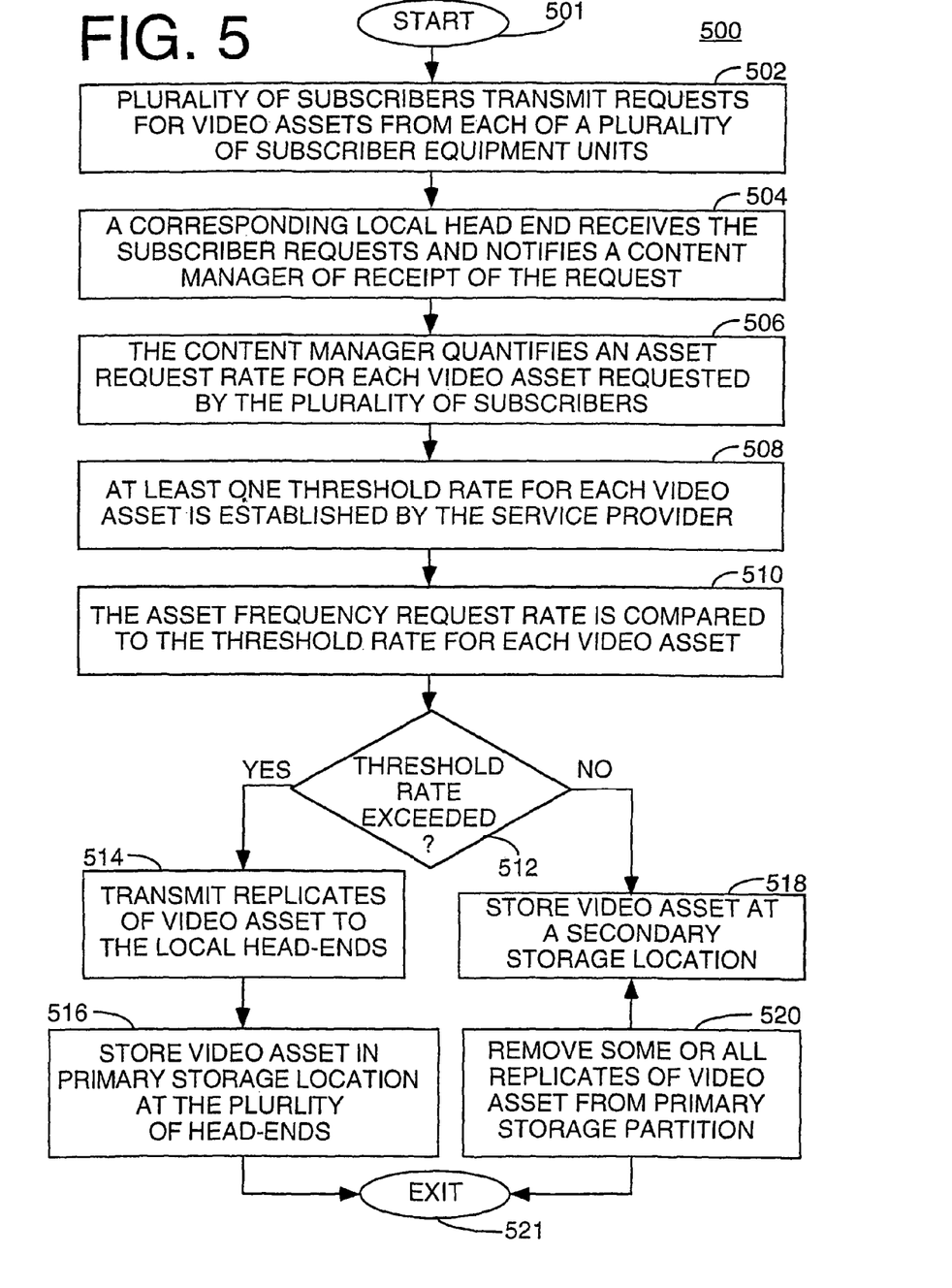
FIG. 5 depicts a flow diagram of a method of storing video assets at various locations suitable for use in the interactive information distribution systems of FIG. 1 and FIG. 2.

FIG. 5 depicts a flow diagram representing a method 500 of storing video assets at the various locations in the interactive information distribution system. The method is used in an interactive information distribution system such as an interactive video distribution system 100 or 200 of FIGS. 1 and 2.

The method 500 starts at step 501 and proceeds to step 502 where a plurality of subscribers transmit requests for video content from each of a plurality of subscriber equipment. At step 504, each local video stream server at a plurality of head-ends designated to support the plurality of subscribers, receives the subscriber requests and notifies the content manager thereof. At step 506, the content manager at each local head-end collectively quantifies a subscriber asset request rate for each video asset.

The service provider, at step 508, sets at least one threshold rate for each video asset in order to establish a frequency request level for subscriber requests of video assets. Then, at step 510, the subscriber asset request rate is compared to the threshold rate for each video asset.

The method 500 queries, at step 512, whether the asset request rate traverses the threshold rate. If the query is affirmatively answered, then, at step 514, the video asset is directed by the management tools to be streamed to the primary storage partitions at each of the plurality of head-ends designated to store the replicates of that video asset. The head-ends that store the replicated video asset are those based upon traversing the threshold request rate for that specific head-end. If one of the threshold rates for the entire system is traversed, then, at step 516, the video asset is stored amongst all of the plurality of head-ends in the interactive information distribution system.

Alternatively, if the query of step 512 is negatively answered, the method 500 deems that the asset request rate does not traverse the threshold rate. At step 518, the video asset is directed by the management tools to be stored at the secondary storage partition. At step 520, some or all of the video assets that are replicated on the primary storage partitions may be removed, depending on the subscriber request rate at that specific head-end, and the method 500 ends at step 521.

In the first embodiment as depicted in FIG. 1, the infrequently requested video assets are stored on the secondary storage partition 119 at the remote server head-end 110R. In the second embodiment as depicted in FIG. 2, the infrequently requested video assets are divided amongst each of the plurality of head-ends and then stored on their respective secondary storage partitions. In either the first or second embodiments, there is a separation of frequently requested video assets from infrequently requested assets. The result of this method is a reduction of storage capacity required for storing the thousands of video assets in duplication, while still providing the assets to the plurality of subscribers seamlessly without delay.

Another feature of this inventive system is file transfer to the subscriber at a faster rate than the subscriber equipment can retrieve the file. The video assets comprise a number of files that include the play track, fast-forward track, rewind track, movie information screen (MIS), preview, etc. When the file is transferred from the video stream server, multiple file transfers may be launched simultaneously faster than real time. For example, normal play track can be transferred at nine times real time (e.g. 30 MB/sec), fast-forward track at real time (3.3 MB/sec), and rewind track in reverse in real time.

These files may be simultaneously transferred by the video stream server. They are transmitted by the server (e.g., bursts) to the subscriber equipment at a faster rate than the subscriber can retrieve these files, even at the fast-forward rate of transfer. For example, if the video server transmits a movie to a subscriber, who, at the same time plays the movie in the fast-forward mode, the video stream server will transmit the movie before the subscriber will finish playing the movie in fast-forward mode. In this way, the stream server will satisfy a new customer request for the title, even though the title has not been completely transferred from the remote server. Thus, as long as the transfer from the stream servers is faster, it will always be ahead of the subscriber's access to the title.

It should be apparent to those skilled in the art that a novel system for storing and distributing video content on a plurality of servers within an interactive information distribution system has been provided. The methods and apparatus described herein eliminate the need for independent storage devices at each neighborhood site and redistributes much of the video content across the entire network of servers. Although various embodiments that incorporate the teachings of the present invention have been shown and described in detail herein, those skilled in the art can readily devise many other varied embodiments that still incorporate these teachings.

What is claimed is:

1. An apparatus comprising:
 a server configured to distribute requested video assets to requesting user equipment via an access network, the server comprising:
  a storage medium comprising a primary storage partition configured to store frequently requested video assets and a secondary storage partition configured to store infrequently requested video assets;
  a manager configured to manage migration of video assets, wherein the manager is configured to track asset request rates and threshold rates of respective video assets;
  wherein the manager, in response to an infrequently requested video asset becoming frequently requested, is configured to select and transmit the frequently requested video asset to at least one primary partition of each of at least two servers;
  wherein the manager, in response to a frequently requested video asset becoming infrequently requested, is configured to select and transmit the infrequently requested video asset to at least one secondary partition of at least one, but less than the all of, the at least two servers and removing the infrequently requested video asset from the primary partitions.

2. The apparatus of claim 1, wherein:
 the manager is configured to identify an infrequently requested video asset as becoming frequently requested when the asset request rate crosses above the threshold rate; and
 the manager is configured to identify a frequently requested video asset as becoming infrequently requested when the asset request rate crosses below the threshold rate.

3. The apparatus of claim 2, wherein:
 in response to receiving a request for a video asset from requesting user equipment, the manager is configured to control distribution of the requested video asset from one of the servers identified as storing the requested video asset to the requesting user equipment.

4. The apparatus of claim 3, wherein the server is a local server and is operatively connected to a remote server comprising a storage medium having a primary partition and a secondary partition, the apparatus further comprising:
 a content manager configured to receive the request for the video asset and determine whether the requested video asset is stored locally in the storage medium of that local server at which the video asset request is received or stored remotely in the storage medium of the remote server;
 a stream session manager configured to direct a server to distribute streams of video assets to user equipment requesting the video assets; and
 a content session manager configured to respond to video asset requests forwarded from managers of other servers.

5. The apparatus of claim 4, wherein the content manager of the local server at which a video asset request is received, in response to determining that a requested video asset is stored locally, is configured to notify the stream session manager to deliver the requested video asset by the local server to the requesting user equipment via the access network.

6. The apparatus of claim 4, wherein the content manager of the local server at which a video asset request is received, in response to determining that a requested video asset is stored remotely in the storage of a remote server, is configured to instruct the stream session manager of the local server to contact a content session manager of the remote server.

7. The apparatus of claim 6, wherein the content session manager of the remote server is configured to identify the requested video asset in the storage of the remote server, allocate bandwidth for transmitting the requested video asset, and, in response to a determination that the requested video asset is to be provided from the remote server to the requesting user equipment via the local server, notify a server of the remote server to transmit the requested video asset to the local server using the access network.

8. A computer-implemented method comprising:
 receiving at a server, an indication whether asset request rates for a plurality of video assets stored in a plurality of servers exceeds respective threshold rates for the plurality of the video assets;
 in response to an infrequently requested video asset becoming frequently requested, selecting and transmitting the frequently requested video asset to at least one primary partition of each of the plurality of servers, wherein each server serves as a local server to a respective group of user equipment devices via an access network and a remote server to at least one other group of user equipment devices; and
 in response to a frequently requested video asset becoming infrequently requested, selecting and transmitting the infrequently requested video asset to at least one secondary partition of at least one, but less than all of, the plurality of servers, and removing the infrequently requested video asset from the primary partitions.

9. The method of claim 8, further comprising:
 for each infrequently requested video asset that becomes a frequently requested video asset, removing the infrequently requested video asset from a secondary storage partition.

10. The method of claim 8, further comprising:
 receiving, at one of the servers, a request for a video asset;
 identifying a server storing the requested video asset, wherein the identified server comprises one of the local servers at which the video asset request is received or one of the other servers remote from the server at which the video asset request is received;
 causing the identified server storing said requested video asset to begin providing the requested video asset; and
 transmitting the requested video asset through an access network to the user equipment device initiating the video asset request.

11. The method of claim 10, wherein, when the identified server is the local server coupled directly to the requesting user equipment device, the local server provides the requested video asset to the requesting user equipment device via the access network.

12. The method of claim 11, wherein, when the identified server is one of the remote servers, the local server requests the requested video asset from the remote server and the remote server provides the requested video asset to the local server via an inter-server network.

13. An apparatus comprising:
- a storage medium having a primary storage partition for storing frequently requested video assets and a secondary storage partition for storing a portion of infrequently requested video assets that are selectively distributed amongst a plurality of servers comprising at least a local first server and a remote second server; and
- a manager configured to control processing of video asset requests from a first group of user equipment and distribution of video assets to the requesting user equipment, wherein the manager comprises:
  - a content manager configured to receive a request for a video asset from the requesting user equipment in the first group of user equipment and determine whether the requested video asset is stored locally in the storage of the first server or stored remotely in the storage of the remote second server configured to control processing of video asset requests from a second group of user equipment;
  - a stream session manager configured to direct the apparatus to distribute requested video assets to the requesting user equipment; and
  - a content session manager configured to receive asset requests forwarded from the plurality of servers, identify and retrieve requested video assets requested by content managers of the plurality of servers, and provide requested video assets to the plurality of servers,
- wherein the manager, in response to an infrequently requested video asset becoming frequently requested, is configured to select and transmit the frequently requested video asset to at least one primary partition of at least the local first server and the remote second server;
- wherein the manager, in response to a frequently requested video asset becoming infrequently requested, is configured to select and transmit the infrequently requested video asset to at least one secondary partition of at least one server, but less than all, of the plurality of servers.

14. The apparatus of claim 13, wherein the content manager, in response to determining that the requested video asset is stored locally, is configured to notify the stream session manager to deliver the requested video asset to a local server for transmission by the local server to the requesting user equipment.

15. The apparatus of claim 13, wherein the content manager, in response to determining that the requested video asset is stored remotely in the storage of a different server, is configured to instruct the stream session manager of a local server to contact a content session manager of the remote server.

16. The apparatus of claim 15, wherein the content session manager of the remote server is configured to identify the requested video asset in the storage of the remote second server and allocate bandwidth for transmitting the requested video asset.

17. The apparatus of claim 16, wherein, in response to a determination that the requested video asset is to be provided from the remote second server to the requesting user equipment via the first local server, the content session manager of the remote server is configured to notify the server of the remote second server to transmit the requested video asset to the first local server.

18. The apparatus of claim 17, wherein, in response to a determination that a server of the local first server is available to receive the requested video asset from the remote second server, a server of the remote second server is configured to stream the requested video asset to the local first server over an inter-server network.

19. The apparatus of claim 18, wherein a server of the local first server is configured to receive the requested video asset from a server of the remote second server, wherein the received video asset is stored in the storage of the local first server.

20. The apparatus of claim 16, wherein, in response to a determination that the requested video asset is to be provided directly from the remote second server to the requesting user equipment, the content session manager of the remote second server is configured to request a stream session manager of the remote second server to allocate bandwidth for providing the requested video asset to the requesting user equipment.

21. The apparatus of claim 20, wherein the stream session manager of the remote second server is configured to notify a server of the remote second server to stream the requested video asset to the requesting user equipment.

* * * * *